United States Patent Office 3,536,718
Patented Oct. 27, 1970

3,536,718
SILANEDIOL-AMINE HYDROHALIDE
COMPLEXES
Terry G. Selin, Schenectady, N.Y., assignor to General
Electric Company, a corporation of New York
No Drawing. Continuation-in-part of application Ser. No. 514,686, Dec. 17, 1965. This application Nov. 22, 1968, Ser. No. 778,318
Int. Cl. C07d 31/28, 103/02
U.S. Cl. 260—290                                   10 Claims

ABSTRACT OF THE DISCLOSURE

This invention relates to tetraaryldisiloxanediol-tertiary amine hydrohalide complexes, such as a tetraphenyldisiloxanediol-pyridine hydrochloride complex, which can be decomposed to tetraphenyldisiloxanediol, which can be used in conventional fashion as an intermediate in the preparation of conventional organopolysiloxanes.

---

This application is a continuation-in-part of copending application Ser. No. 514,686 filed Dec. 17, 1965, and now abandoned.

This invention relates to a new class of complexes. In particular, this invention relates to tetraaryldisiloxanediol-tertiary amine hydrohalide complexes having the formula:

(1)  $[(HO)(R)_2Si]_2O \cdot Q \cdot HX$ wherein R is selected from the group consisting of phenyl, alkylphenyl containing from 1 to 3 alkyl groups each of not more than 4 carbon atoms and haloalkylphenyl containing from 1 to 3 haloalkyl groups each of not more than 4 carbon atoms and 3 halogen atoms, Q is a tertiary amine selected from the group consisting of quinoline, pyridine, mono- di- and tri- alkyl-substituted pyridine, wherein each alkyl moiety is of not more than 4 carbon atoms and

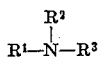

wherein $R^1$, $R^2$ and $R^3$ are selected from the group consisting of phenyl and alkyl of not more than 8 carbon atoms and X is halogen selected from the group consisting of chlorine, bromine, fluorine and iodine.

The complexes of the present invention are useful as intermediates in the reaction with organohalogenosilanes to form new siloxane linkages.

In the above formula, R can be, for example, phenyl, o-tolyl, m-tolyl, p-tolyl, 2,6-xylyl, p-ethylphenyl, p-butylphenyl, 2,6-dibutylphenyl, 2,4,6-trimethylphenyl, 2,4,6-triethylphenyl, 2-methyl-6-ethylphenyl 2 - chloromethylphenyl 2 - bromomethylphenyl, 2 - iodomethylphenyl, 2,6-dichloromethylphenyl, 2,4 - dichloroethylphenyl, p - trichloromethylphenyl, p - trifluoromethylphenyl, and the like. In the above formula, $R^1$, $R^2$ and $R^3$ can be, for example, phenyl, methyl, ethyl, propyl, isopropyl, n-butyl, isobutyl, t-butyl, amyl, hexyl, heptyl, octyl and the isomers of alkyl of not more than 8 carbon atoms.

In the above formula, Q can be, for example, trimethylamine, triethylamine, tripropylamine, tributylamine, triamylamine, triphenylamine, ethyldiphenylamine, N,N-dimethylaniline, N,N-diethylaniline, N,N-dipropylamiline, N,N-dibutylaniline, methyl pyridine, diethyl pyridine, trimethylethyl pyridine, dibutyl pyridine, and the like.

In the preferred embodiment of my invention, R is phenyl, Q is pyridine, and X is chlorine.

The amine hydrohalide complexes of the present invention can be prepared by one of two general methods. In the first and preferred method, a tetraaryldihalodisiloxane having the formula:

(2)  $[(X)(R)_2Si]_2O$ where R and X are as previously defined, is reacted with water and pyridine. The reaction is conducted in the presence of a suitable solvent, generally an aromatic solvent, such as toluene or benzene, so as to facilitate manipulation of the starting materials and the final product. In general, the water is present in an amount sufficient to hydrolyze the two silicon-bonded halogen atoms of the tetraaryldihalodisiloxane which, of course, requires the presence of two moles of water per mole of the disiloxane. The tertiary amine is present in an amount sufficient to provide one mole of amine per mole of the disiloxane. The solvent is present in an amount sufficient to dissolve only a portion, e.g., 10 percent, of the reactants and reaction products at a temperature of about 100° C. to 115° C. In the case of toluene, and with the disiloxane being tetraphenyldichlorodisiloxane, the amount of toluene required is about three to four parts per part of the disiloxane. Excess amounts of toluene or other solvent can be employed, but no particular advantage is derived therefrom and the presence of too much solvent introduces complications in the isolation of the final amine hydrohalide complex.

While I do not wish to be bound by theory, it is believed that the reaction proceeds via an intermediate stage in which the reaction mixture comprises a diaryldisiloxanediol having the formula:

(3)  $[(HO)(R)_2Si]_2O$ and an amine hydrohalide. The diol of Formula 3 results from the hydrolysis of the silicon-bonded halogen atoms as soon as the dihalodisiloxane of formula 2 and the water are mixed together, and the amine hydrohalide results from reaction between the amine and the hydrogen halide which is released upon hydrolysis of the silicon-bonded halogen.

Upon further reaction, which takes place immediately in the reaction mixture, the tetraaryldisiloxanediol of Formula 3 and the amine hydrohalide react to produce the disiloxanediol-amine hydrohalide complex of Formula 1.

Regardless of the mechanism of the reaction involved in the present application, the desired complexes of Formula 1 are prepared by simply mixing the tetraaryldihalodisiloxane of Formula 2 with water, solvent, and tertiary amine in the amounts previously described and an immediate reaction takes place. In order to insure that the reaction has gone to completion, the reaction mixture is heated to an elevated temperature, generally the reflux temperature of the reaction mixture which is about 100° C. to 120° C., and the mixture is refluxed for about 10 to 30 minutes. During refluxing, two liquid phases form. The upper phase is an organic solvent phase and the lower phase is the complex of Formula 1. The mixture is then cooled to induce crystallization of the complex of Formula 1, which can be further purified by recrystallization from a suitable solvent, such as acetonitrile or a mixture of acetonitrile and toluene.

The second method of preparing the siloxanediol-tertiary amine hydrohalide complexes of the present invention serves as confirmation of my theory of the mechanism of this reaction and involves the reaction of equimolar amounts of a preformed diaryldisiloxanediol of Formula 3 with a tertiary amine hydrohalide in the presence of a suitable solvent, such as toluene, which needs be present in an amount sufficient to dissolve only a portion, e.g., about 10 percent, of the reactants. In this second method, the tetraaryldisiloxanediol of Formula 3 and the amine hydrohalide and solvent are mixed at room temperature, then heated to the reflux temperature of solvent, and subsequently cooled to room temperature to precipitate the complex of Formula 1. This complex can be further purified by recrystallization from a suitable solvent as in the first method.

The following examples are illustrative of the practice of my invention and are not intended for purposes of limitation.

EXAMPLE 1

To a solution of 113 g., 1,3-dichloro-1,1,3,3-tetraphenyl-disiloxane and 20 g. dry pyridine and 270 g. toluene was added 9 g. of water, which was sufficient to hydrolyze the silicon-bonded chlorine atoms of the chlorosiloxane. The resulting material was refluxed at a temperature of 115° C. to 120° C. for 30 minutes, during which time two liquid phases developed. Upon cooling, the lower liquid phase crystallized and was isolated from the reaction mixture. This crystalline mass was recrystallized twice from acetonitrile, yielding large, well-formed crystals. These crystals were the amine hydrochloride complex of tetraphenyldisiloxanediol and had a melting point of 146° C. to 149° C. This complex corresponded to Formula 1 where R is phenyl, Q is pyridine, and X is chlorine. Infrared analysis of these crystals showed strong absorption at 3.6 to 3.8 microns, which is characteristic of hydrochlorides. Elemental analysis showed the presence of 2.64% nitrogen, 6.70% chlorine, and 6.42% hydroxyl, as compared with the theoretical values of 2.73% nitrogen, 6.74% chlorine and 6.55% hydroxyl. As additional characterization of the product a few crystals of the material were added to a mixture of ether and water. Although the crystals were insoluble in both of the pure solvents, the complex settled in the interface between the two liquids and rapidly dissociated. Isolation of the ether phase, followed by solvent removal, yielded pure tetraphenyldisiloxanediol.

EXAMPLE 2

Following the procedure of Example 1, 127 g. of 1,3-dichloro-1,1,3,3-tetra-m-tolyldisiloxane and 20 g. of dry pyridine was added to 250 g. of toluene. Thereafter, 9 g. of water was added to completely hydrolyze the dichlorodisiloxane. The mixture was heated at the reflux temperature of about 115° C. and maintained at this temperature for 30 minutes. The heating resulted in the formation of a two-phase liquid mixture and, upon cooling to room temperature, the lower liquid phase crystallized. This material was the pyridine hydrochloride complex of tetra-m-tolyldisiloxanediol.

EXAMPLE 3

This example illustrates the preparation of complexes of the present invention starting with a disiloxanediol. To a reaction vessel was added 41.4 g. of tetraphenyldisiloxanediol-1,3, 18.5 g. of diethylaniline hydrochloride and 130 g. toluene. This reaction mixture was heated to a temperature of 110° C. to 120° C. and maintained at this temperature for 20 minutes and then cooled to room temperature. Upon cooling, a complex within the scope of the present invention immediately precipitated and this precipitate was separated from the toluene layer to produce a complex within the scope of Formula 1, where Q was diethylaniline, X is chlorine, and R is phenyl. This complex was in the form of plate-like crystals having a melting point of 134° C. to 135° C.

EXAMPLE 4

The procedure of Example 3 was repeated except that 11.5 g. of pyridine hydrochloride was employed instead of the diethylaniline hydrochloride. The product resulting from this run was in the form of white crystalline needles having a melting point of 147° C. to 149° C. and were identical to the product formed in Example 1.

EXAMPLE 5

The procedure of Example 3 was repeated except that 16.0 g. of pyridine hydrobromide was substituted for the diethylaniline hydrochloride of Example 3. This resulted in white crystalline needles having a melting point of 128° C. to 133° C. and which were within the scope of Formula 1 when R is phenyl, Q is pyridine, and X is bromine.

EXAMPLE 6

The procedure of Example 3 was repeated except that 13.8 g. of triethylamine hydrochloride was substituted for the diethylaniline hydrochloride of Example 3. After heating the mixture of ingredients at 110° C. to 120° C. for 20 minutes, this reaction mixture was cooled to about 5° C. to precipitate a needle-like complex within the scope of Formula 1, where R is phenyl, Q is triethylamine, and X is chlorine. This crystalline complex had a melting point of 73° C. to 96° C.

EXAMPLE 7

This example illustrates the use of the complexes of the present invention. In particular, 24.6 g. (0.05 mole) of the pyridine hydrochloride complex of Example 1 was added to a reaction vessel which contained 7.9 g. pyridine in 90 g. benzene. To this reaction mixture was added dropwise, 6.4 g. (0.05 mole) dimethyldichlorosilane. After the addition was completed, the reaction mixture was stirred at room temperature for one hour and then the reaction mixture was washed several times with water to remove pyridine hydrochloride. The benzene solvent was then stripped from the reaction mixture, resulting in 1,1,3,3-tetraphenyl-5,5-dimethylcyclotrisiloxane. This composition is useful in the formation of linear diorganopolysiloxanes containing controlled proportions of diphenylsiloxane units and dimethylsiloxane units in regular order. The polymerization is effected by mixing the cyclotrisiloxane with 10 parts per million potassium hydroxide and heating the reaction mixture to a temperature of about 100° C., at which time polymerization is effected almost instantaneously.

What I claim as new and desire to secure by Letters Patent of the United States is:

1. Tetraaryldisiloxanediol-tertiary amine hydrohalide complexes of the formula:

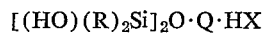

wherein R is selected from the group consisting of phenyl, alkylphenyl containing from 1 to 3 alkyl groups each of not more than 4 carbon atoms and haloalkylphenyl containing from 1 to 3 haloalkyl groups each of not more than 4 carbon atoms and 3 halogen atoms, Q is a tertiary amine selected from the group consisting of quinoline, pyridine, mono-, di- and trialkyl-substituted pyridine wherein each alkyl moiety is of not more than 4 carbon atoms, and

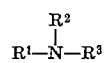

wherein $R^1$, $R^2$ and $R^3$ are selected from the group consisting of phenyl and alkyl or not more than 8 carbon atoms and X is halogen selected from the group consisting of chlorine, bromine, fluorine and iodine.

2. The complex of claim 1 wherein Q is pyridine and X is chlorine.
3. The complex of claim 1 in which R is phenyl.
4. The complex of claim 1 in which R is tolyl.
5. The complex of claim 1 in which Q is pyridine.
6. The complex of claim 1 in which Q is triethylamine.
7. The complex of claim 1 in which Q is N,N-diethylaniline.
8. The complex of claim 1 in which X is chlorine.
9. The complex of claim 1 in which X is bromine.
10. The complex of claim 1 in which R is phenyl, Q is pyridine, and X is chlorine.

References Cited
UNITED STATES PATENTS

| | | | |
|---|---|---|---|
| 2,972,598 | 2/1961 | Morehouse | 260—46.5 |
| 3,222,369 | 12/1965 | Prescott et al. | 260—290 |

ALAN L. ROTMAN, Primary Examiner

U.S. Cl. X.R.

260—283, 448.2